United States Patent [19]

Smith et al.

[11] Patent Number: 4,733,602
[45] Date of Patent: Mar. 29, 1988

[54] HYDRAULIC BRAKE ACTUATOR WITH PARKING BRAKE

[75] Inventors: Eric G. Smith, Burlington; Chuck Crawford, Stoney Creek, both of Canada

[73] Assignee: WABCO Ltd., Stoney Creek, Canada

[21] Appl. No.: 840,342

[22] Filed: Mar. 17, 1986

[51] Int. Cl.⁴ .............................................. F15B 15/26
[52] U.S. Cl. .................. 92/21 MR; 92/27; 92/63; 188/67
[58] Field of Search .................. 92/21 R, 21 MR, 23, 92/24, 26–28, 63; 91/44, 519; 188/67

[56] References Cited

U.S. PATENT DOCUMENTS

| | | | |
|---|---|---|---|
| 3,176,590 | 4/1965 | Uhtenwoldt et al. | 92/28 X |
| 3,314,335 | 4/1967 | Gulick | 92/26 X |
| 3,643,765 | 2/1972 | Hanchen | 92/26 X |
| 3,808,947 | 5/1974 | Simmons et al. | 92/23 X |
| 3,941,141 | 3/1976 | Robert | 92/24 X |
| 3,995,534 | 12/1976 | Rastetter | 92/24 X |
| 4,185,539 | 1/1980 | Stratienko | 92/24 X |
| 4,419,924 | 12/1983 | Peter et al. | 92/27 |

FOREIGN PATENT DOCUMENTS

| | | | |
|---|---|---|---|
| 592465 | 2/1960 | Canada | 92/26 |
| 103555 | 3/1984 | European Pat. Off. | 92/28 |

Primary Examiner—Robert E. Garrett
Assistant Examiner—George Kapsalas
Attorney, Agent, or Firm—G. J. Falce

[57] ABSTRACT

A hydraulic brake actuator including a hydraulic parking brake that can be applied by mechanically locking up either a normal service brake application or a hand pump operated brake application. The lock-up mechanism includes a friction collar that surrounds the piston push rod and a hand pump actuated locking member that surrounds the friction collar. The friction collar and locking member have complementary conical surfaces that are engageable when hydraulic hand pump pressure is applied to a piston face of the locking member to wedge the friction member into pressure engagement with the piston push rod, as a means of locking up the push rod to obtain a parking brake. The locking member also includes a plurality of spring-like fingers that project axially from the periphery of the locking member and are provided with latching tabs adapted to enter a recess in the body to prevent return-movement of the locking member when the hydraulic hand pump operation is terminated. A plug member is provided to prevent the tabs from being disengaged from the recess. This provides a means for releasing the locking mechanism by either manually or hydraulically withdrawing the plug member, thereby allowing the hand brake to be released by separation of the conical surfaces of the locking member relative to the friction collar.

15 Claims, 4 Drawing Figures

HYDRAULIC BRAKE ACTUATOR WITH PARKING BRAKE

BACKGROUND OF THE INVENTION

The gradual acceptance of hydraulic brake systems in the rapid transit segment of the railway industry suggests the possibility of using hydraulics as a means of transmitting brake forces to the brake shoes in freight-type service. Such an approach would be advantageous in eliminating the need for the cumbersome mechanical brake rigging presently employed on freight cars to transmit the brake forces to the brake shoes. For example, in truck-mounted brake systems, two brake beams are employed per truck, and each beam carries a pneumatic brake cylinder which is interconnected to the adjacent beam of the same truck by a push rod. In order to achieve the desired brake forces, these pneumatic cylinders are relatively large and heavy. Accordingly, the beams that carry these brake cylinders must be specially designed with sufficient strength to support the brake cylinder. This precludes the use of standard, low-cost brake beams typically used in truck-mounted brake systems. By employing relatively small hydraulic brake actuators instead of large pneumatic cylinders to actuate the brake beams, a considerable weight-reduction can be realized, making it possible to utilize light-weight brake beams. Such an arrangement is shown in FIG. 1 of the accompanying drawings, wherein a single hydraulic brake actuator 1 is mounted on one of a pair of light-weight brake beams 2a and 2b having brake shoes 3 carried thereon for engagement with the truck wheel treads. The brake actuator 1 may be mounted, for example, by connecting the actuator body 6 to one arm of a bellcrank lever 4a that is pivotally-attached to brake beam 2b, while the actuator push rod 7 is connected to one arm of another bellcrank lever 4b that is also pivotally-attached to brake beam 2b. The other arm of the respective bellcrank levers 4a and 4b is then connected to the other brake beam 2a by push rods 5a and 5b.

Moreover, a hydraulic-type brake actuator lends itself to a vastly different parking brake concept, which would permit elimination of the conventional, often difficult to operate, handwheel-operated parking brake.

The hydraulic brake actuator contemplated by the present invention can be kept small in size, by reason of the fact that hydropneumatic converters are known having force-multiplication for producing the high hydraulic pressure required.

The converter device 8 includes a relatively large pneumatic piston 9, and a relatively small hydraulic piston 10 that is connected to the pneumatic piston. The hydraulic piston 10 operates in a hydraulic cylinder 11 to displace hydraulic fluid therefrom to the hydraulic system via a port 12, as the pneumatic/hydraulic piston is actuated. The converter device 8 further includes a slack adjuster piston 14 that operates between end stops 15, 16 in a hydraulic reference chamber 17, as the piston assembly is actuated through its nominal stroke, thereby displacing a predetermined amount of hydraulic fluid sufficient to take up the brake shoe clearance. Should overtravel occur due to brake shoe wear, a first one-way check valve 18 is unseated by engagement of the slack adjuster piston 14 with a pin 12a at the one end stop 16, thereby opening a passageway through the slack adjuster piston 14 via which any additional hydraulic fluid required to maintain brake shoe engagement is supplied from the hydraulic cylinder 11.

During a subsequent brake release, the slack adjuster piston 14 is retracted into engagement with the other end stop 15 to establish the desired brake shoe clearance, following which, continued movement of the piston assembly to release position, corresponding to overtravel during the preceding brake application, draws makeup hydraulic fluid into the hydraulic cylinder 11 from the hydraulic reservoir 19 via a second one-way check valve 20.

In the event brake shoe engagement occurs prematurely, i. e., prior to completion of the first stage of operation, a high pressure is developed in the reference chamber 17, due to brake shoe engagement occurring before complete displacement of hydraulic fluid has taken place. Accordingly, a one-way check valve 21a, between the reference chamber 17 and hydraulic reservoir 19, is opened by the hydraulic pressure buildup, to thereby allow the excess hydraulic fluid in the reference chamber 17 to be displaced into the reservoir 19, until the slack adjuster piston 14 engages end stop 16. During a subsequent brake release, the brake shoes will be retracted as the slack adjuster piston 14 is returned to its original position—against its other end stop 15—thereby establishing the desired brake shoe clearance.

A single hydropneumatic converter device, such as that just described, can therefore be utilized to deliver relatively high hydraulic pressures to light-weight hydraulic brake actuators 1 mounted either on or between standard brake beams 2a and 2b of a railway car truck, as shown in FIG. 1.

SUMMARY OF THE INVENTION

The object of the present invention is to provide a hydraulic brake actuator that incorporates a parking brake capable of being applied either in conjunction with the service brake or independently thereof.

Another object of the invention is to limit the stroke of the parking brake piston of the hydraulic brake actuator of the present invention so as to not exceed a distance corresponding to the nominal brake shoe clearance.

Another object of the invention is to provide a hydraulically-actuated, friction-locking mechanism associated with the brake actuator push rod, in order to lock up the push rod following either a service brake application or a parking brake application, and thereby maintain a parking brake force indefinitely following release of the service or parking brake application.

It is yet another object of the invention to provide a means for unlocking the friction-locking mechanism, either manually or hydraulically, to release the parking brake.

Briefly, in achieving these objectives, the hydraulic brake actuator comprises concentric service and parking brake pistons, the former of which is directly engageable with a piston push rod, while the latter of which is engageable with the push rod through a drag link that permits lost-motion of the push rod with the parking brake piston an amount corresponding to the nominal brake clearance to be maintained.

The parking brake mechanism comprises a friction collar having a bevelled face with which a correspondingly-shaped surface of a hydraulically-actuated locking member is engageable, upon longitudinal actuation of the locking member a predetermined distance, to clamp the collar tightly around the surface of the push rod following actuation of the push rod. This clamping action between the collar and the push rod effectively locks the push rod in its applied position. Concurrently, a conical-shaped tab end of a series of annular fingers, projecting longitudinally from the locking member, enter into an annular recess in the bore in which the locking member operates to arrest longitudinal movement of the locking member. A spring-loaded plug is biased to enter the opening, formed within the annular fingers, to prevent longitudinal retraction of the locking member following release of hydraulic fluid pressure therefrom.

When it is desired to subsequently release the parking brake, the plug member is withdrawn from within the annular fingers either by pulling a manual lever that extends exteriorly of the brake actuator housing, or by supplying hydraulic fluid under pressure to a piston face of the plug member. When the plug is thus withdrawn from the fingers, the conically-shaped tab ends of the fingers are forced out of locking engagement with their locking recess under the action of a spring acting on the locking member. Accordingly, the locking member is retracted longitudinally out of engagement with the friction collar to thereby relieve the clamping pressure of the friction collar on the push rod. A return spring of the push rod is thus effective to move the push rod to its brake-release position, and the parking brake mechanism is conditioned for a subsequent parking brake application.

Other objects and advantages of the present invention will become apparent from the following more detailed explanation, when taken in conjunction with the accompanying drawings, in which:

DESCRIPTION OF THE PREFERRED EMBODIMENTS

Figure 1:
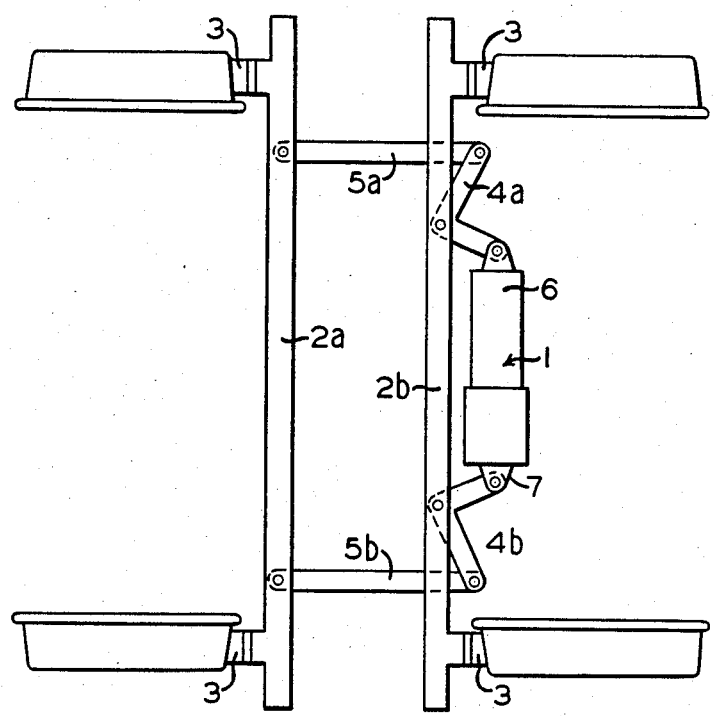
FIG. 1 is an outline assembly view of a railway freight car truck, showing one exemplary arrangement of a brake actuator of the present invention supported on one of the brake beams for applying the beam-mounted brake shoes to the wheel treads.
Figure 2:
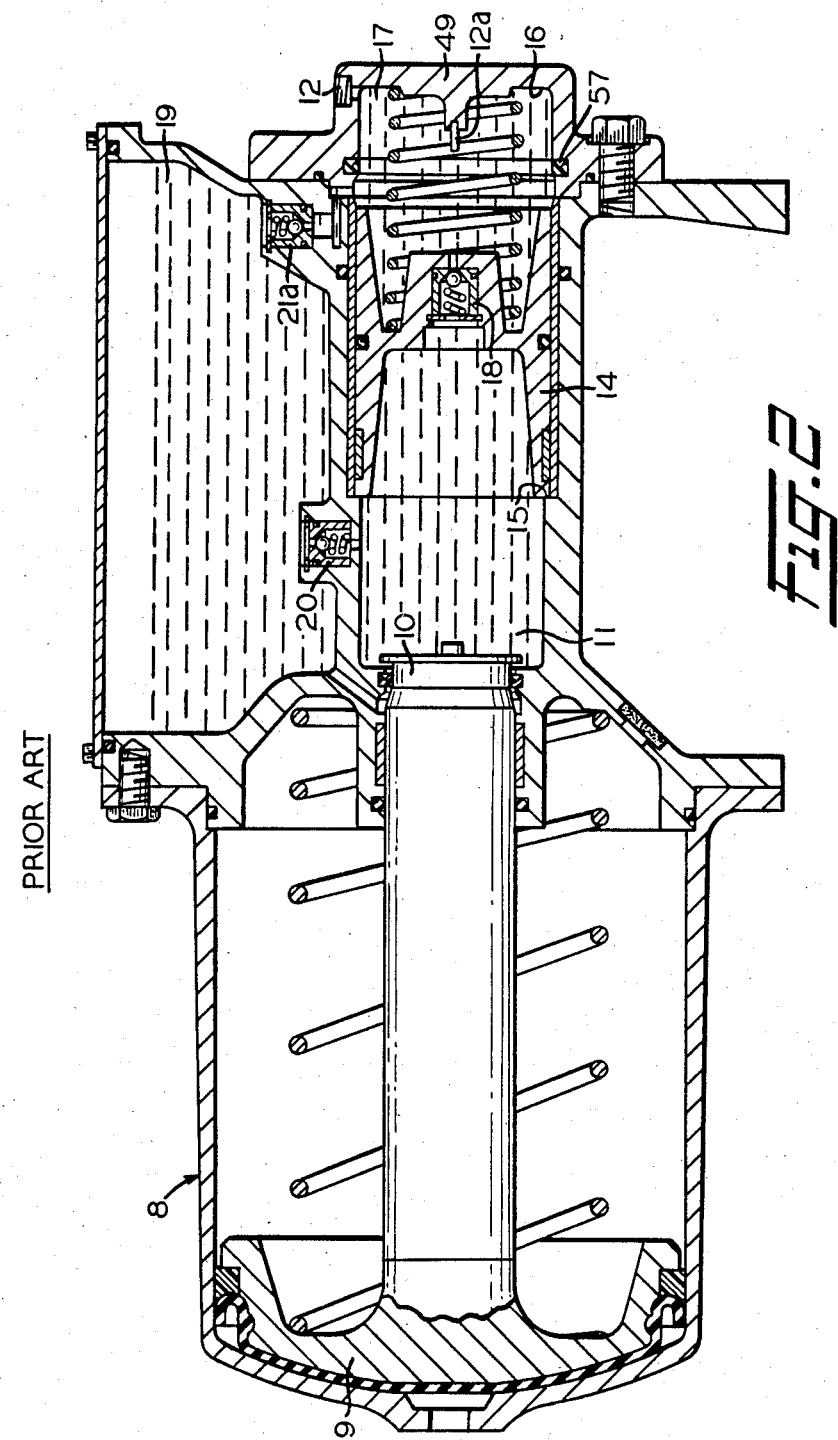
FIG. 2 is a sectional assembly view of a known hydropneumatic-type converter, which the hydraulic actuator of the present invention is envisioned as cooperating with to provide a service brake application in a truck-mounted hydraulic brake system for a freight car installation.
Figure 3A:
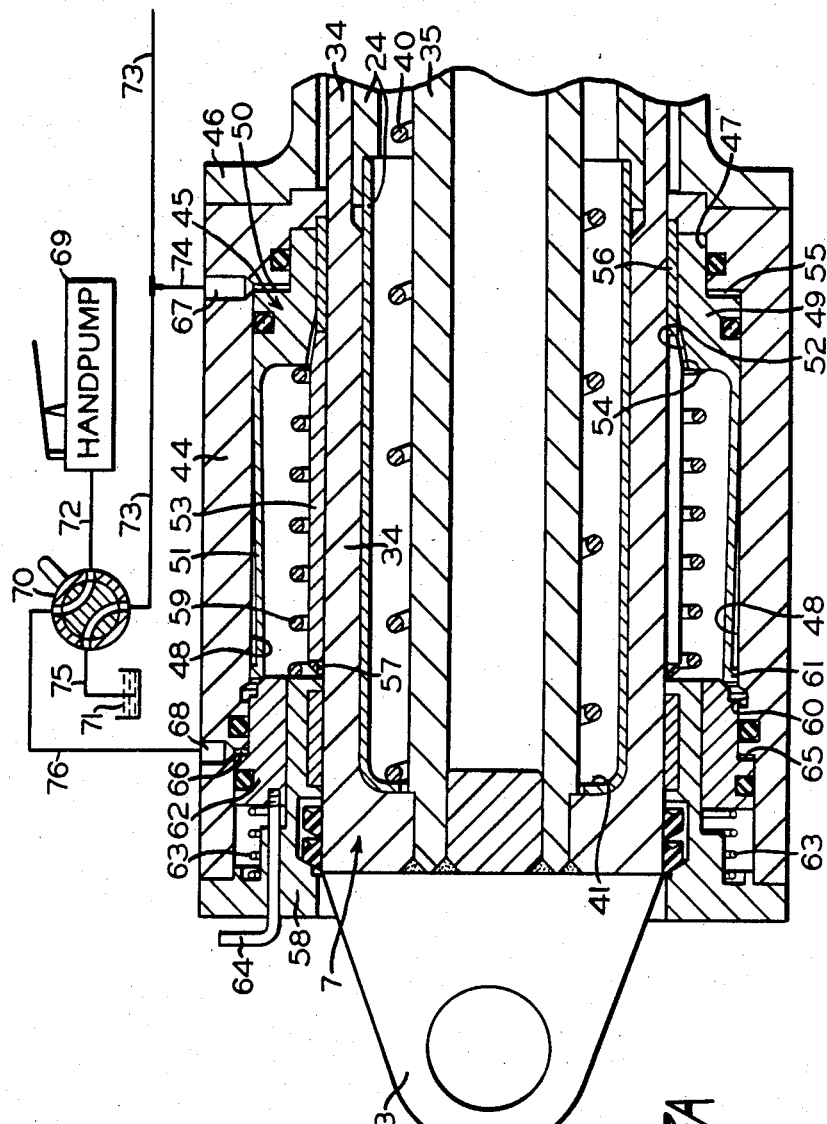
FIGS. 3A and 3B are partial sectional assembly views which, when placed end-to-end, show the hydraulic actuator of the present invention in a brake-release position.
Figure 3B:
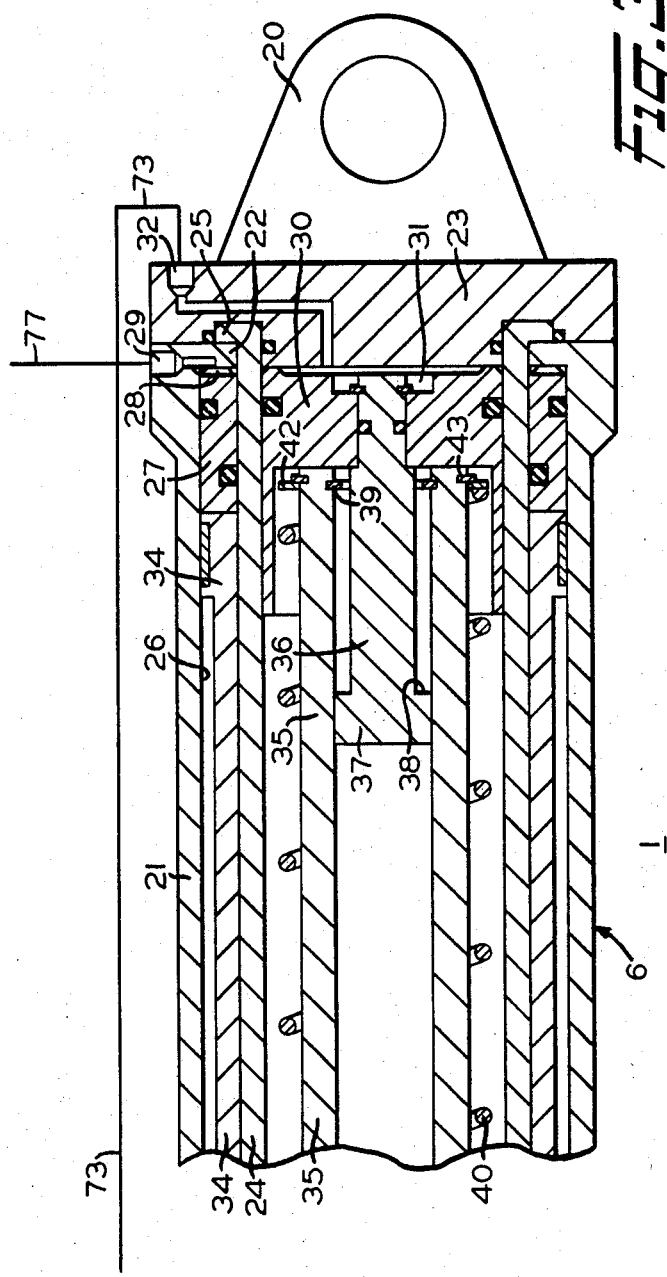

Referring now to FIGS. 3A and 3B of the drawings, brake actuator 1 comprises body 6, including a casing 21, one end of which is formed with an inturned flange 22, against which an end plate 23 is suitably secured, as by bolts (not shown), to close this end of the body. End plate 23 is formed with a support flange 20, by which means one end of the brake actuator may be mounted to the one bellcrank lever 4a (as shown in FIG. 1). A longitudinally-disposed sleeve 24 is provided with an outturned flange 25 that is clamped between inturned flange 22 of casing 21 and end plate 23. The projecting end of sleeve 24 extends interiorly of body 1, so as to be in concentric, spaced-apart relationship with a longitudinal body bore 26. Sealingly-disposed within the annular space between bore 26 and the outer surface of sleeve 24 is an annular service piston 27, which forms, in cooperation with inturned flange 22, a hydraulic chamber 28, with which hydraulic fluid is communicable via port 12 of the hydropneumatic converter device 8 of FIG. 1 and a port 29 in casing 21 of actuator 1.

A parking brake piston 30 is operatively-disposed within sleeve 24 in sealing engagement with the inner periphery thereof, and cooperates with end plate 23 to form a hydraulic chamber 31, with which hydraulic fluid is communicable via a port 32 in end plate 23.

Piston push rod 7 comprises a cylindrical outer hollow rod 34 that is guidably-supported within the annular space between casing 21 and sleeve 24, so as to be engageable with service piston 27, and a cylindrical inner hollow rod 35 that is disposed within sleeve 24 in spaced-apart relationship with the inner periphery thereof. The outer and inner hollow rods are connected together at one end by a support flange 33, by which means, the push rod 7 may be connected to the other bellcrank lever 4b (as shown in FIG. 1) to support the other end of brake actuator 1. A drag link 36 is fixed to parking brake piston 30, so as to project longitudinally from the side of piston 30, opposite hydraulic chamber 31. Formed on the projecting end of drag link 36, is an enlarged head 37 that projects into the opening of inner hollow rod 35 and forms a shoulder 38 with drag link 36. A retaining ring 39 is contained in the opening of inner hollow rod 35, with which shoulder 38 of head 37 is engageable to provide a lost-motion connection between parking brake piston 30 and piston push rod 7. A push rod return spring 40 surrounds inner hollow rod 35, seated at one end on an inturned flange 41 of sleeve 24, and at the other end on an annular ring 42 that is held in place by a retaining ring 43 in the outer periphery of inner hollow rod 35.

Body 6 of brake actuator 1 further comprises a casing 44, in which a brake lock-up mechanism 45 is housed. Casing 44 is bolted or otherwise secured to an outturned flange 46, formed around the open end of casing 21, so as to surround the outer hollow rod 34 of piston push rod 7. A bore 47 and counterbore 48 of casing 44 contain an annular locking member 49 having a piston face 50, a plurality of elongated spring-like fingers 51 that project axially from the periphery of locking member 49, and an annular conical surface 52. An axially-split friction sleeve 53 is slidably-disposed about the outer periphery of outer hollow rod 34 in light contact therewith. Sleeve 53 is provided with a conical surface 54 that is complementary to conical surface 52, and is aligned for engagement thereby when locking member 49 is shifted in a leftward-direction. Such leftward movement of locking member 49 can occur in response to pressurization of a hydraulic chamber 55 in which piston face 50 operates. One end of sleeve 53, adjacent conical surface 54, is adapted to engage a stop member 56 to establish a predetermined maximum distance that the locking member 49 can be shifted leftwardly before engagement of the respective conical surfaces 52, 54 occurs. A Belleville-type spring 57 is located between the other end of sleeve 53 and a closure member 58 that is bolted or otherwise secured to casing 44. Another spring 59 acts between closure member 58 and locking member 49 to urge the locking member toward a retracted position, as shown.

Counterbore 48 is arranged with an annular recess 60, having one side thereof tapered. Formed at the end of each finger 51, is a latching tab 61, that also has a tapered side conforming to the tapered side of recess 60.

In the retracted position of locking member 49, tabs 61 of fingers 51 ride along counterbore 48, so as to deflect the fingers radially sufficiently to prevent an annular plug member 62 from entering the annular opening between the fingers and sleeve member 53. A spring 63 acts between the plug member 62 and closure member 58 to maintain plug member 62 in constant engagement with the tab end of fingers 51. Plug member 62 is formed with a bevel at its point of engagement with fingers 51, for a purpose that will be hereinafter explained.

Plug member 62 further comprises a threaded opening to receive a manually-operable pull arm 64, via an opening in closure member 58, as well as a piston face 64 that is subject to hydraulic pressure in a chamber 66.

A port 67 leads to hydraulic chamber 55, and a port 68 leads to hydraulic chamber 66. These ports 67 and 68, as well as port 32, may be connected to a hand pump 69, via a selector valve 70, that can be manually set to supply hydraulic pressure from the hand pump 69 concurrently, to either ports 67 and 32 or port 68, while returning hydraulic fluid under pressure from the other of these ports to a sump 71. While the aforementioned hand pump 69, selector valve 70, and sump 71 have been represented symbolically as conventional devices, it is within the purview of the present invention to utilize a more sophisticated hand pump, which incorporates a selector valve and hydraulic sump therein.

Hand pump 69 is connected to selector valve 70, via a line 72, while another line 73 and a branch line 74 are connected from selector valve 70 to ports 32 and 67, respectively. Also connected to selector valve 70 from sump 71 is a line 75, while a line 76 is connected from selector valve 70 to port 68. Another line 77 is connected from port 12 of hydropneumatic converter device 8 to port 29 of brake actuator 1. When a service brake application is desired, hydropneumatic converter device 8 is operated to output hydraulic fluid under pressure via port 12, which is connected, via line 77, to port 29 of brake actuator 1. This hydraulic pressure is effective in chamber 28 of brake actuator 1, to force the service piston 27 leftwardly. In that upper hollow rod 34 of piston push rod 7 is maintained in engagement with service piston 27, by return spring 40, piston push rod 7 is forced leftwardly with the service piston, as is inner hollow rod 35. Due to the lost-motion connection between parking brake piston 30 and inner hollow rod 35, piston push rod 7 is able to travel far enough to take up brake shoe clearance, as well as deflection of the brake parts, without the parking brake piston 30 being pulled out of its release position.

As the service piston 27 and piston push rod 7 continue to move leftwardly due to brake shoe wear, the additional hydraulic fluid required by the increased volume of chamber 28 will be provided by converter device 8. Concurrently, retainer ring 39 on inner hollow rod 35 will pick up shoulder 38 of drag link 36 and shift the drag link, and consequently parking brake piston 30, leftwardly an amount corresponding to the brake shoe wear. As the volume of hydraulic chamber 31 increases with leftward movement of parking brake piston 30, hydraulic fluid from sump 71 will be drawn into chamber 31 via line 75, selector valve 70, line 73, and port 32 to accommodate such movement of the parking brake piston. This movement of the parking brake piston with overtravel of the service brake piston during a service brake application is desirable from the standpoint of making a parking brake application, as will be hereinafter explained.

During a release of the service brake application, return spring 40 is effective to force piston push rod 7 and service piston 27 rightwardly, forcing the hydraulic fluid in chamber 28 back to hydropneumatic converter 8 via port 29, line 77, and port 12 until an amount of fluid corresponding to the nominal brake shoe clearance has been displaced, as determined by the slack adjuster action of hydropneumatic converter 8. As this occurs, the end of inner hollow rod 35 is brought into abutment with parking brake piston 30, without actually moving piston 30, so that the distance between retainer ring 39 and shoulder 38 corresponds to the nominal brake shoe clearance to be taken up on the subsequent brake application.

During the service brake application and subsequent release, as just discussed, it will be appreciated that the piston push rod 33 moves unrestricted by the action of friction sleeve 53, since spring 59 is effective to maintain conical surface 52 of locking member 49 out of engagement with conical surface 54 of sleeve 53.

In order to apply the parking brake, selector valve 70 is rotated to a parking brake application position, in which fluid communication is established between lines 75 and 76, thereby connecting chamber 68 to sump 71, and in which fluid communication is concurrently established between lines 72 and 73, thereby connecting hand pump 69 to ports 67 and 32. Hand pump 69 is then operated to supply hydraulic fluid to chambers 31 and 55 concurrently. Until the brake shoe clearance is taken up, however, only parking brake piston 30 moves in response to this hand pump operation, and not locking member 49; since, during the stroke of parking brake piston 30, to take up the nominal brake shoe clearance, the increasing volume of chamber 31 precludes any significant buildup of pressure either in chamber 31 or concurrently at the piston face 50 of locking member 49. Accordingly, the combined forces on locking member 49, exerted by springs 63 and 59, prevent actuation of locking member 49 until the piston push rod has been fully extended. Parking brake piston 30 acts against inner hollow rod 35 so that, during leftward movement of parking brake piston 30, piston push rod 7 is likewise extended leftwardly to take up the brake shoe clearance.

It should be noted at this point that the stroke of parking brake piston 30 is maintained constant, irrespective of the amount of brake shoe wear due to the action of the lost-motion connection between piston push rod 7 and parking brake piston 30. As previously explained, leftward movement of parking brake piston 30, with brake shoe wear during service brake application, draws hydraulic fluid into chamber 31 as the volume of chamber 31 increases. Thus, the amount of fluid needed to move parking brake piston 30 sufficiently to take up brake shoe clearance and to apply the brakes, remains constant, regardless of the amount of brake shoe wear existing at the time the parking brake is applied.

It will be apparent that without this feature of the invention, excessive operation of the hand pump 69 would be required to satisfy the ever-increasing volume of chamber 31 with brake shoe wear.

Once the brake shoe clearance has been taken up, the volume of chamber 31 remains essentially constant, so that continued operation of hand pump 69 will result in a pressure-buildup of hydraulic fluid in chamber 55 acting on face 50 of locking member 49. As the force of this hydraulic fluid exceeds the combined forces of springs 63 and 59, locking member 49 is shifted to the left. This leftward movement of locking member 49 acts, via fingers 51 and tabs 61, to effect movement of plug member 62 to the left until tabs 61 are aligned with annular recess 60. In this position, the tensioned spring-like fingers 51, aided by the bevel edge of plug member 62 being forced to the right by spring 63, snap latching tabs 61 in a radial direction into locking engagement with recess 60. Once the latching tabs 61 enter recess 60, spring 63 is effective to shift plug member 62 in a rightward-direction into the opening formed within the fingers 51 to positively-secure the tabs 61 into latching engagement with recess 60.

The leftward movement of locking member 49 also brings about engagement of the complementary conical surfaces 52 and 54 of locking member 49 and friction sleeve 53, for a purpose to be explained. Once this latched condition of locking member 49 has been attained, further operation of hand pump 69 may be terminated. This latched condition can be ascertained by achieving a certain predetermined hydraulic pressure (through operation of the handpump) that is capable of overcoming the force of springs 63 and 59 when these springs are compressed sufficiently to allow latching tabs 61 to become aligned with locking recess 60. A suitable gage (not shown) associated with the handpump may be provided for this purpose.

Followng termination of handpump operation, the hydraulic pressure in lines 73 and 74 will bleed down. As this pressure depletion becomes effective at chamber 31, parking brake piston 30 and piston push rod 7 tend to be retracted to release position by the force of return spring 40. However, since the pressure depletion at chamber 55 will have no effect on locking member 49, its position is maintained by the locking engagement of latching tabs 61 in recess 60. Consequently, the slight rightward movement of friction sleeve 53 with piston push rod 7 will result in the end of the friction collar having conical surface 54 being wedged between the conical surface 52 of locking member 49 and the periphery of outer hollow rod 34 to increase the friction force with which collar 53 grips the push rod to lock the push rod against axial movement toward brake-release position. Initiation of this self-energization effect, by which the wedging action between collar 53 and push rod 7 occurs, is ensured by spring 57, which exerts a rightward-force on collar 53 in support of the rightward-acting force on collar 53 due to its frictional engagement with push rod 7. In this way, the brake force of either a service brake application or a hand pump controlled parking brake application is mechanically locked up to obtain a parking brake.

A release of the parking brake can be accomplished in one of two ways. Normally, selector valve 70 would be rotated from the parking brake application position to the parking brake release position, as shown. This results in chamber 66 being connected to hand pump 69 via lines 76 and 72, and chambers 31 and 55 being connected to sump 71 via lines 73, 74 and 75. Operating hand pump 69 thus supplies hydraulic fluid under pressure to chamber 66, where it acts on piston face 65 to force plug member 62 to the left against the opposing force of spring 63. Removal of plug member 62 from within fingers 51 allows the finger tabs 61 to slip out of engagement with locking recess 60 under the influence of spring 59, urging locking member 49 to the right. This disengagement of latching tabs 61, from locking recess 60, is facilitated by the fact that adjoining sides of the tab and recess are tapered. Following disengagement of tabs 61 from recess 60, the piston push rod 7, friction collar 53, and locking member 49 are all shifted to the right until the end of collar 53 (having conical surface 54) engages stop member 56. When this occurs, continued movement of locking member 49, relative to collar 53, results in their respective conical surfaces 52 and 54 separating to relieve the high frictional force by which collar 53 had been engaged with push rod 7. Accordingly, the piston push rod 7 is free to be fully retracted by its return spring 40, as determined by engagement of the inner hollow rod 35 with parking brake piston 30.

It will be appreciated that the position of parking brake piston 30 reflects any previously accumulated brake shoe wear, so that the fully-retracted position of push rod 7 is such as to restore the nominal brake shoe clearance established by the slack adjuster function of hydropneumatic device 8 to its previous value.

A manual release of the parking brake may be alternatively made by simply withdrawing plug member 62, from fingers 51, by means of the manual pull arm 64. The resultant action of the brake lock-up mechanism 45 will then be the same as just explained with respect to a hand pump initiated parking brake release.

In the event a service application is in effect at the time of the parking brake application, a subsequent release of the parking brake will cause the brake lock-up mechanism 45 to release (as just explained), but the piston push rod 7 will remain in brake application position, under the influence of service piston 27 acting through outer hollow rod 34 to maintain the effective brake application, until a service brake release is subsequently made.

While the specifics of the present invention lie with the hydraulic brake actuator 1, and an arrangement has been discussed in which a single actuator is arranged with conventional-type brake beams of a railway car truck, it is to be understood that the brake actuator of the present invention may also be used in an arrangement employing two such actuators mounted between the brake beams. It should also be understood that other hydropneumatic-type converters may be applicable (as well as the disclosed converter device 8) to supply the hydraulic pressure to brake actuator 1, and to provide slack adjuster action for maintaining a desired brake shoe clearance in accordance with conventional freight car practice.

We claim:

1. A brake actuator device comprising:
   (a) a body;
   (b) a push rod;
   (c) a sleeve member disposed on said push rod so as to be axially slidable thereon;
   (d) a parking brake piston engageable with said push rod to effect movement of said push rod relative to said sleeve member to a brake aplication position in response to the supply of fluid under pressure thereto;
   (e) a locking piston member movable to a locking position in response to said supply of fluid under pressure to said parking brake piston following movement of said push rod to said brake application position, said locking piston having wedging engagement with said sleeve member in said locking position to force said sleeve member into tight engagement with the periphery of said push rod and accordingly lock said push rod against further axial movement relative to said sleeve;

(f) first spring means acting on said locking piston member in opposition to said fluid pressure thereat, for preventing said movement of said locking piston member to said locking position, until the fluid pressure effective at said locking piston member exceeds a predetermined value;

(g) a bore in said body in which said locking piston member is operative;

(h) an annular recess formed in said bore;

(i) a plurality of elongated fingers projecting longitudinally from the periphery of said locking piston member; and (j) an outturned latching tab formed on at least one of said fingers, so as to enter said recess in said locking position of said locking means.

2. A brake actuator, as recited in claim 19, wherein said sleeve member is cylindrical in shape and is split in an axial direction, so as to provide said axial slidable-fit with said push rod except in said locking position of said locking means.

3. A brake actuator, as recited in claim 2, wherein said sleeve member includes a first conical surface surrounding the outer periphery thereof, said locking piston member being operable in a bore of said body and formed with a second conical surface engageable with said first conical surface in said locking position of said locking piston member to effect said wedging of said sleeve member into tight engagement with the periphery of said push rod.

4. A brake actuator, as recited in claim 3, further comprising second spring means between said body and one end of said sleeve member for urging said sleeve member in a direction toward engagement of said first and second conical surfaces.

5. A brake actuator, as recited in claim 4, further comprising a stop member fixed in said body adjacent the other end of said sleeve member to establish the axial position of said sleeve member relative to said locking piston member when said locking piston member is retracted from said locking position, whereby said first and second conical surfaces are axially spaced-apart from each other a predetermined distance.

6. A brake actuator, as recited in claim 1, wherein said predetermined value corresponds to the value at which said movement of said parking brake piston to said actuated position occurs.

7. A brake actuator, as recited in claim 1, wherein said latching tab is provided on each of said fingers.

8. A brake actuator, as recited in claim 7, further comprising:
(a) an annular plug member having a beveled edge engageable with the projecting end of said plurality of fingers; and
(b) second spring means acting on said plug member in a direction opposing said movement of said locking piston member to said locking position, whereby said fingers are urged radially outwardly such that, said latching tabs are maintained in engagement with said bore in order to assure that said latching tabs enter said recess in said locking position of said locking piston member.

9. A brake actuator, as recited in claim 8, wherein said latching tabs are each provided with an inclined side, and the adjacent side of said recess is formed with a complementary inclined side, whereby said fingers are deflected radially inwardly in response to said first spring means urging movement of said locking means from said locking position to a retracted position when said fluid under pressure thereat is relieved.

10. A brake actuator, as recited in claim 9, wherein said plug member is provided with an outer peripheral surface, the diameter of which corresponds to the inside diameter of said fingers when said tab is engaged in said recess, whereby said plug member is forced by said second spring means to move axially into the opening of said fingers and thereby prevent inward radial deflection of said fingers to positively secure said latching tabs in said recess.

11. A brake actuator, as recited in claim 10, wherein said plug member further comprises a piston subject to supply of fluid under pressure to urge axial movement of said plug member in a direction away from engagement with said fingers.

12. A brake actuator, as recited in claim 10, wherein said plug member comprises an arm that projects externally of said body to provide for manually withdrawing said plug member from within the opening of said fingers.

13. A brake actuator, as recited in claim 1, wherein said push rod comprises:
(a) a cylindrical outer hollow rod on which said sleeve member is disposed;
(b) a cylindrical inner hollow rod concentrically-disposed within said outer hollow rod, in annular spaced-apart relationship therewith, said outer and inner hollow rods being fixed together at a common end thereof; and
(c) second spring means in said annular space between said inner and outer hollow rods for urging said push rod in a direction away from said brake application position.

14. A brake actuator, as recited in claim 13, further comprising:
(a) a service piston engageable with said outer hollow rod at the end thereof, opposite said common end, said service piston effecting movement of said outer and inner hollow rods to said application position independently of said parking brake piston in response to the supply of fluid under pressure thereto; and
(b) said parking brake piston engageable with said inner hollow rod at the end thereof opposite said common end, said parking brake piston effecting movement of said outer and inner hollow rods to said application position independently of said service brake piston in response to the supply of fluid under pressure thereto.

15. A brake actuator, as recited in claim 14, further comprising:
(a) an axial bore in said inner hollow rod;
(b) a strut rod fixed to said parking brake piston at one end, and having an enlarged head at the other end forming a shoulder between said strut rod and said enlarged head, said strut rod projecting axially from said parking brake piston so that said head is disposed within said bore; and
(c) means fixed on said inner hollow rod so as to extend into the opening of said bore for engaging said shoulder following movement of said inner hollow rod a predetermined distance toward said brake application position in response to said supply of fluid under pressure to said service brake piston, said parking brake piston being moved in conjunction with said service piston following movement of said service brake piston said predetermined distance.

* * * * *